United States Patent

Shatz et al.

[15] 3,640,620
[45] Feb. 8, 1972

[54] PHOTOGRAPHIC CONTROL APPARATUS

[72] Inventors: Abram Shatz, Pomona; Ben Eisenberg, Larchmont, both of N.Y.

[73] Assignee: Kriser Corporation, College Point, N.Y.

[22] Filed: Aug. 27, 1969

[21] Appl. No.: 853,285

[52] U.S. Cl. ...............................355/38, 250/207, 315/360
[51] Int. Cl. ................G03b 27/76, H01j 39/12, H05b 37/02
[58] Field of Search.....................355/38; 315/360; 250/207

[56] References Cited

UNITED STATES PATENTS 3,100,419   8/1963   Clapp ......................................355/38

*Primary Examiner*—Samuel S. Matthews
*Assistant Examiner*—Richard A. Wintercorn
*Attorney*—Darby & Darby

[57] ABSTRACT

Photographic apparatus is disclosed capable of controlling all known photographic processes for exposing photosensitive material, including processes for producing color separation films and plates of the type used in various photomechanical reproduction processes. Photometric measurements are made in the plane of the material which is to be exposed and these measurements are used to program a control unit to establish required exposure time intervals. A set of color-balancing controls for each of the primary colors is provided to establish the relative exposures required for the respective color films or plates. A special timing circuit ensures that the exact amount of light required for proper exposure will be provided regardless of any fluctuation in luminous flux as measured at the enlarger or at the camera copy board. Additionally, the timing circuit permits selection of desired exposure intervals (separate from the main exposure interval) as required for various known photographic operations.

12 Claims, 5 Drawing Figures

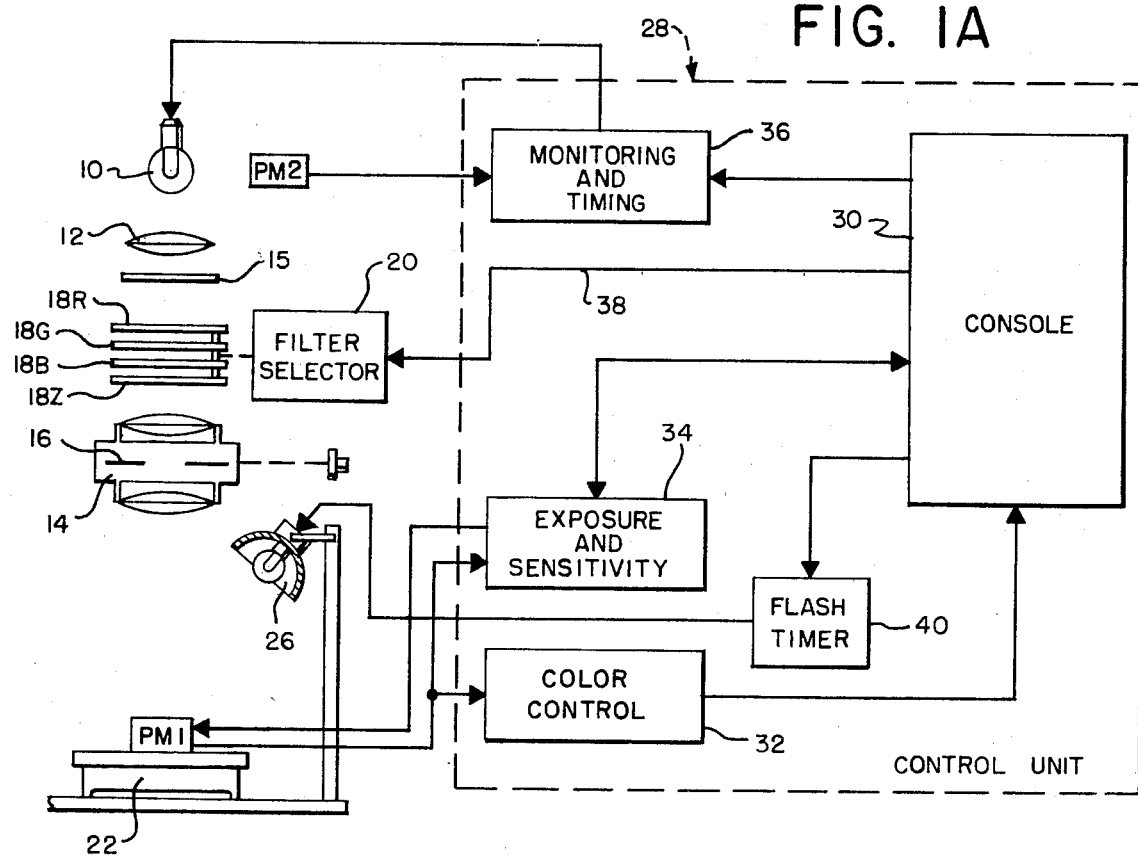
FIG. IA
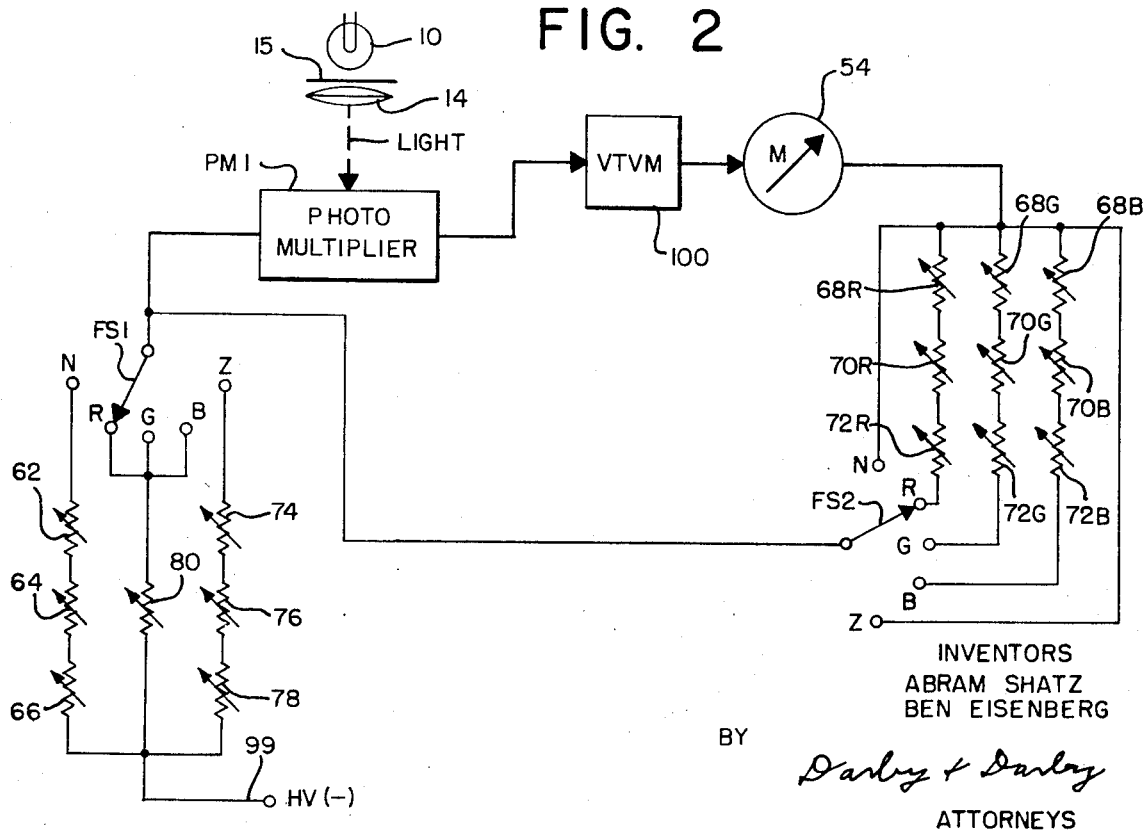
FIG. 2

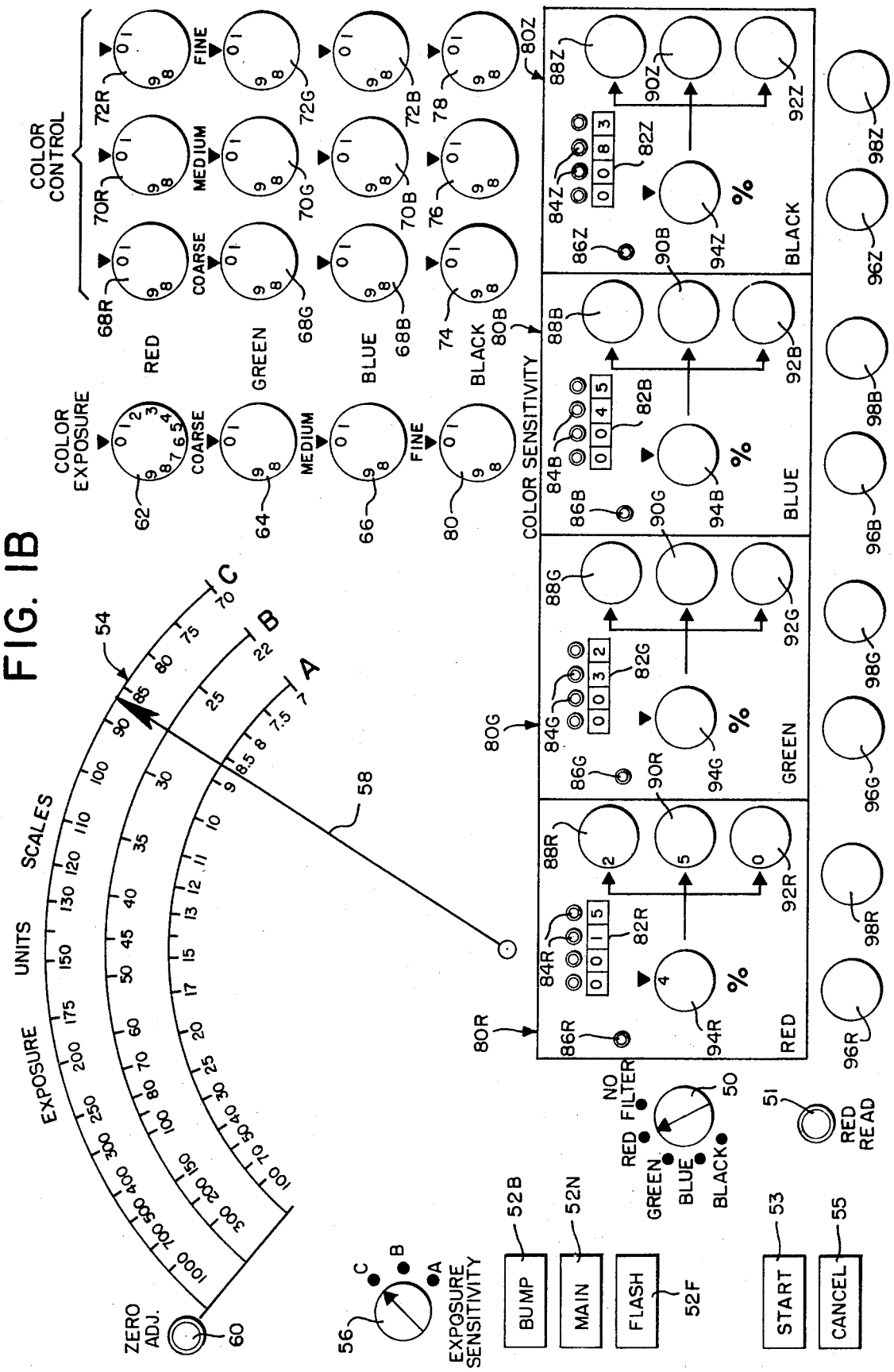

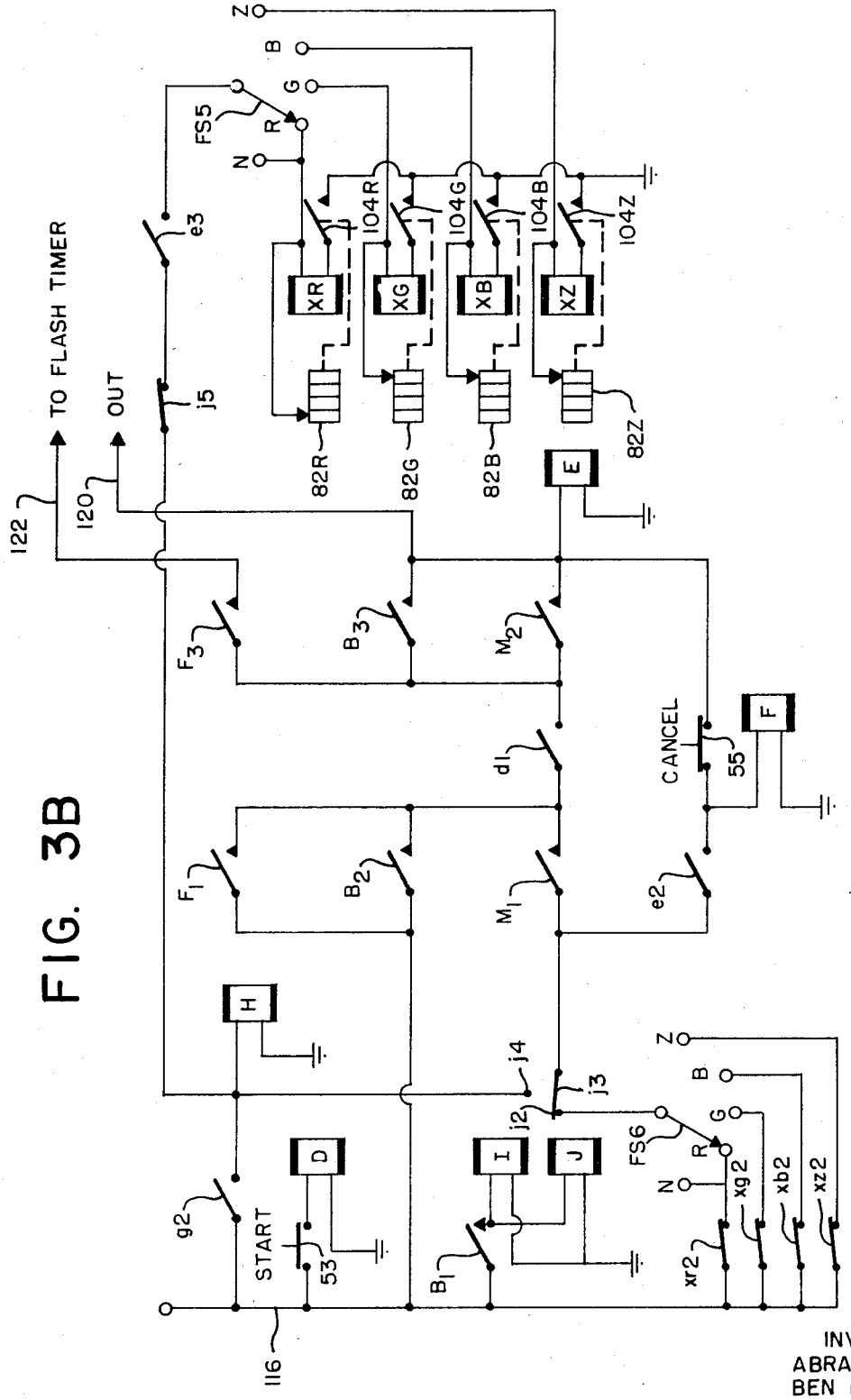

PHOTOGRAPHIC CONTROL APPARATUS

This invention relates to apparatus of general utility in the photographic arts, and useful, for example, in the production of color separation films and plates.

The production of photographic color separation films and plates (hereinafter referred to as images) of the type used in conventional photomechanical reproduction processes is a tedious and expensive undertaking. Primarily, this is because the operation generally is a manual one with numerous operations being required before suitable separation images will result which, when used as a portion of the final printing process, will provide the desired synthesis of colors. Although efforts have been made to automate this process, the resultant processes and apparatus are still far from satisfactory from many points of view. Among other things, such processes and apparatus, though extremely expensive, have limited utility and lace versatility even for their intended purposes. Moreover, the resultant images are often of relatively low quality useful only in a limited number of situations.

The present invention relates to apparatus which is capable of being programmed to retain reference data relating to any number of specific photographic black and white and/or color processes. Once properly programmed, as to any of such processes, the invention may be used to produce perfectly exposed images from any print or transparency without trial and error experimentation and without limitation as to type of photography. According to additional features of the invention, special timing circuits ensure that the desired amount of light will be provided during exposure intervals regardless of any fluctuations in intensity of the photographic light source or change in position of the light source relative to the optical system of the photographic device being used. The timing circuits can also be used to select variable time intervals for special photographic exposures.

The apparatus of the invention is an extremely flexible device which is capable of controlling any process for exposing photosensitive material, including the different exposures required to produce halftone color separation images. These halftone exposures usually require, in addition to the "main" (or detail) exposure, a "no screen" exposure (wherein the halftone screen is removed from the light path to provide shadow scale control), and a flash exposure using a separate light source to enhance shadow dots. Thus, in addition to simplifying the process of producing color separation images, the invention provides various improvements of both general and special utility. Such improvements relate to the timing circuits employed to ensure the proper exposure intervals, the timing circuits used for "no screen" exposures whereby it is possible to select an exposure time equal to a percentage of the main exposure interval, the extremely sensitive photometric techniques employed to provide improved results with minimum effort, and other more specific advantages which will become apparent from the following description and drawings, wherein:

FIG. 1A is a diagrammatic-block diagram depiction of the invention primarily for purposes of explanation;

FIG. 1B illustrates the control console of FIG. 1A;

FIG. 2 is a partial schematic diagram showing the exposure controls and color balancing controls according to the invention; and FIGS. 3A and 3B are schematic diagrams of the timing and monitoring circuits of the invention.

Figure 3A:
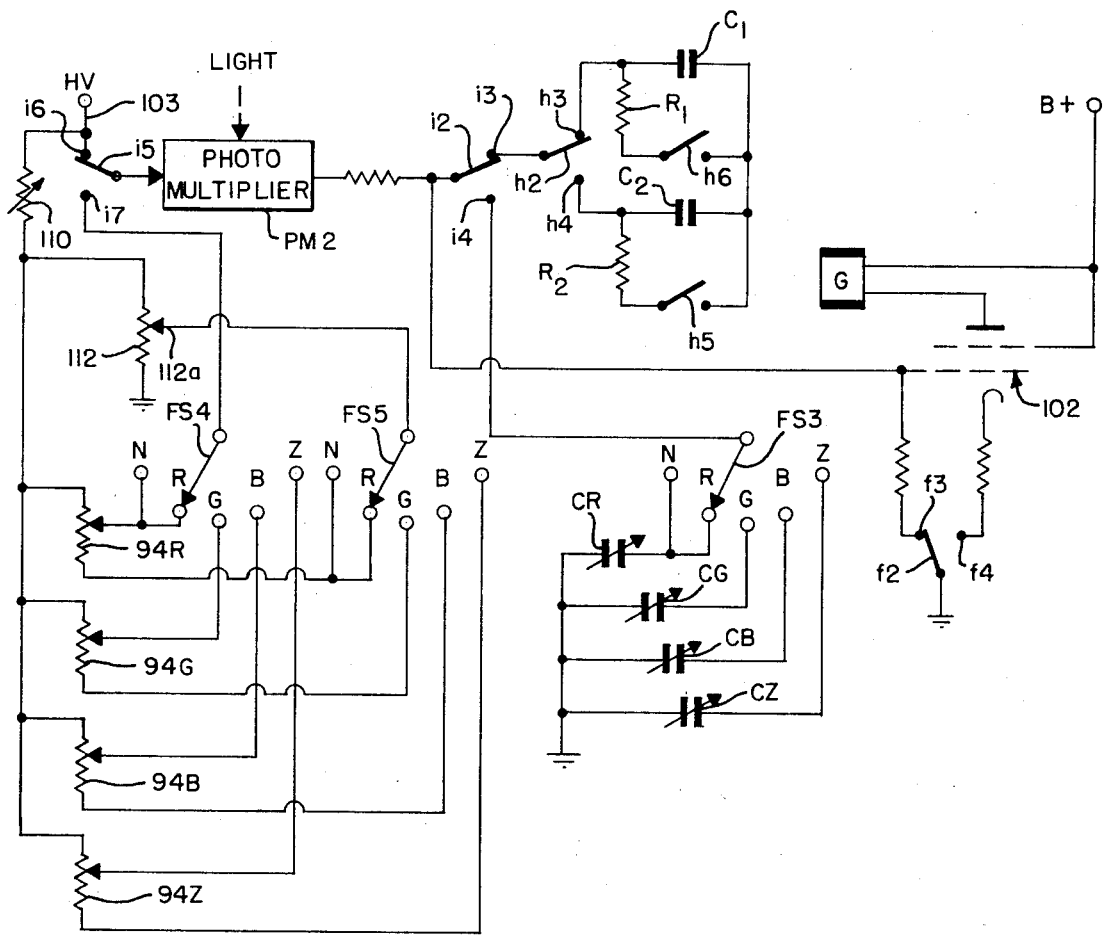

In the following description, the invention is described with reference to the production of red, green, blue and black color separation images. In certain respects, separate circuits are provided for controlling the exposure of the respective images and since the red, green and blue control circuits are essentially identical, those elements associated therewith are identified by a numeral and the letter R, G, or B, respectively. Only the circuits required for production of the red separation image are described in detail below with the understanding that the correspondingly numbered elements in the green and blue circuits operate in the same fashion. To the extent the circuits used to produce a black color separation image are identical to the red, green, and blue circuits, the same numerals are also used followed in this particular case by a Z.

Those skilled in the art will recognize from the following description that the various combinations and subcombinations described will have utility outside of the specific combination described, namely, a device capable of producing color separation images. The photographic techniques controlled by the invention are not novel and therefore are not described in detail.

In FIG. 1, a conventional enlarging apparatus is shown including a light source 10, condenser lens 12, a focusing lens 14 and a manually adjustable iris diaphragm 16 which is used in a well known fashion to regulate the amount of light passing through the lens 14. The transparency to be reproduced is shown at 15.

Red, green, blue, and "black" filters 18R, 18G, 18B, and 18Z, respectively, are mounted in a suitable manner below the lamp 10, so that any one of the filters can be moved selectively into position in front of lens 14 by an actuator shown diagrammatically at 20. As well known, various filters will be used for the manufacture of black separation images, an orange filter being typical. As well known, this is for the purpose of producing four color separation images and the construction of these filters as well as the actuator means 20 is standard in the photographic arts.

Beneath the enlarger, an easel 22 is provided for supporting a photosensitive material or film (not shown) on which the image is to be formed. A "flash" light source 26 is mounted so that it can be manually positioned above the film during the "flash" exposure mode of operation, if required. The operation of "flash" light source 26 is also conventional.

The invention is shown in block diagram form in FIG. 1 within a control unit 28 cooperating with two photomultipliers PM1 and PM2. The photomultiplier PM1 is a movable device which is manipulated by the user and is responsive to light passing through the transparency 15. As explained in further detail below, the purpose of photomultiplier PM1 is to obtain reference data with respect to the required exposure time for any given photographic process and also to obtain data with respect to the relative color balance of any given transparency to be enlarged. The operation of photomultiplier PM2, as also explained in detail below, is to assist in monitoring the "main" and "no screen" exposure intervals and to monitor the intensity of light 10 to ensure that the proper amount of light has been provided during the "main" exposure interval.

The control unit includes a console 30 from which the various control means for the individual circuit elements are accessible, a color control circuit 32, and an exposure and sensitivity control circuit 34, circuits 32 and 34 being responsive to the output of photomultiplier PM1. Monitoring and timing circuit 36 is responsive to the output of photomultiplier PM2 and, as indicated diagrammatically, responsive to the settings of appropriate controls on console 30 for energizing lamp 10. Console 30 also applies a signal to line 38 to cause any one of the filters 18R, 18G or 18B to be positioned in front of lens 14 by the actuator 20. Since this filter-positioning operation according to the preferred embodiment of the invention is conventional, no detailed description is included herein although, of course, it is important that the proper filter be in position during the different color exposure processes.

A flash timer 40 is also responsive to the console 30 and serves to energize the flash light source 26 for a desired interval. This operation is also conventional and is not further explained except to describe the means by which the "flash" actuating signal is produced in the console 30.

The console, shown in FIG. 1B, includes a five position rotary function switch having NO FILTER, RED, GREEN, BLUE and BLACK switch terminals which may be selectively enabled by movement of a control knob 50. In the RED, GREEN, BLUE, and BLACK switch positions, the corresponding filter 18R, 18G, 18B and 18Z, respectively, is placed in front of the lens 14. In the NO FILTER position there is no filter in front of the lens. The function switch 50 thus serves to actuate the appropriate circuits for each of the individual exposure plates. A "red read" switch 51 is provided to selectively place the red filter 18R only in the light path when required.

Three push button switches 52B, 52N and 52F corresponding to the "no screen," "main" and "flash" exposure intervals are provided on console 30. In producing each of the four separation images, these are the three exposure intervals generally used, with the "no screen" exposure, as is customary in the art, hereinafter being referred to as the "bump" exposure. The purpose of these individual exposures, briefly alluded to above, is well known.

The actual exposure intervals in all cases are initiated by actuation of a "start" switch 53. A "cancel" switch 55 terminates any exposure upon actuation.

A meter 54 is provided on console 30 and includes three scales A, B and C which can be selected by a switch 56 whereby the position of pointer 58 relative to the selected scale provides an indication of either density, log illuminance, or exposure time relative to density or log illuminance. Only the time scales (calibrated in exposure units) are shown in FIG. 1B for purposes of clarity. The meter circuit is connected in circuit with the photomultiplier PM1 and serves to indicate the required exposure intervals. A conventional zero adjust knob 60 is provided so that the meter can be properly zeroed prior to use.

The console is intended to be programmed with reference data relative to exposure intervals, and this is provided by three decade resistors, the knobs of which are shown at 62, 64 and 66, corresponding to coarse, medium and fine settings. As shown below, by varying these control knobs, the output of photomultiplier PM1 is changed thus also changing the reading of the meter 54. These color exposure controls 62, 64, 66 serve the purpose of programming the apparatus so that upon insertion of any desired transparency, the required relative exposure times can be read directly in sequence from the meter 54.

Color balance of the respective separation images is provided by the controls 68, 70 and 72 (R, G and B). by using these controls to set individual decade resistors, the circuit of meter 54 is adjusted so that this desired color balance can be maintained regardless of the color balance of any particular transparency employed. Each of the controls 64, 66, 68, 70 and 72 is calibrated in the same way as control 62 so that precise indications of resistor settings are available and reproducible at will. These controls preferably, may be "clicked" into any one of 10 discrete positions to facilitate resetting of the controls. A color sensitivity control 80 is connected in the circuit of photomultiplier PM1 when function switch 50 is in the RED, GREEN or BLUE switch positions and thus has the same effect on the meter reading as would a change in light intensity and which is the same for all colors.

Coarse, medium and fine black color controls 74, 76, and 78 (identical to control 62) also control decade resistors but function somewhat differently from the resistors 68, 70 and 72.

The console also includes red, green, blue and black timing modules 80R, 80G, 80B and 80Z, all of which are identical. Each includes a four-digit counter 82R which can be set to any four-digit number by the respective pushbuttons 84R. A reset button 86R returns the counter to zero. The counter functions in response to pulses of a nominal 1-second rate and is used to control the "main" exposure interval.

Each timing module also includes hundreds, tens and units timing controls 88, 90 and 92, respectively, which control decade condensers, as explained below, so that in the "bump" mode, an exposure time interval, dependent upon the value of the condensers connected in the circuit, can be selected. This timing interval is also dependent upon the position of a control dial 94 which selects a percentage of the reading dialed in by the controls 88, 90 and 92. Thus, as will become more apparent from the description with respect to FIG. 3A, once a three-digit time base has been selected by the controls 88, 90 and 92, and the associated control member 94 positioned to select any percentage between 2 and 10, the resultant figure represents the "bump" exposure interval. For example, if the hundreds control 88R is set to 2, the tens control 90R set to 5, the units control 92R set to zero, and the percentage control 94 set to 4, the "bump" exposure interval in the RED function switch position will be 10 seconds (i.e., 0.04×250).

Each timing module 80 also includes two flash control knobs 96 and 98 to select a "flash" exposure interval. In the preferred embodiment of the invention, the flash control circuits operate independently of the "bump" and "main" exposure circuits and therefore are not described in detail.

Prior to describing the specific circuits employed in the preferred embodiment of the invention, a brief example of the manner in which the system of FIG. 1 can be used to produce a set of separation negatives is offered to facilitate a basic understanding of the invention. It is again emphasized that inasmuch as the photographic processes per se are not deemed novel, it is assumed for the most part that those skilled in the art will be familiar with the purposes of the various different procedures which, for this reason, are not described in detail.

The assumption is made that the apparatus has been calibrated for use with a known type and brand of film as well as a specific developing process. It is first necessary to program the device for these specific conditions so that when such conditions are duplicated, regardless of the transparency to be reproduced and the desired enlargement, the invention will permit the same results to be achieved without trial and error. Hence, a satisfactory set of separation negatives must first be made.

Assuming that such satisfactory negatives have been made from a particular transparency, using the same transparency (after removal of the film), the lamp 10 is energized and the photomultiplier PM1 placed under the projected image on easel 22 with a light-transmitting aperture directly under a highlight area so that the highlight will be used as a reference area in the process. This means that the whitest white on the print produced will be a highlight, which is desirable for known reasons. The light-transmitting aperture of photomultiplier PM1 may be adjustable in size (by known means) so that the cathode of the photomultiplier is only responsive to a highlight area. The color exposure controls 62, 64, and 66 are sequentially adjusted to bring the meter pointer 58 to the time reading which exactly corresponds with the main exposure interval which provides the suitable results. The photomultiplier circuit is now set to indicate the amount of time required for a given amount of light to provide a good result for a specific process.

The exposure interval required for the different colors will generally differ. This is because the color filters themselves may differ in density, the relative speed of the film may vary with wavelength of light, and the color of the light source may also affect relative speed. For any specific process, this color balance must be determined by trial and error. However, once it has been determined, the information can be programmed into the machine by the color controls 68, 70 and 72 so that satisfactory results will always be obtained thereafter for the same process regardless of transparency and enlargement.

Thus, assume that the red, green, blue and black negatives required respective exposures of 15, 32, 45 and 85 seconds. To program this color balance data into the machine, the function switch 50 is first turned to the RED switch position. With lamp 10 energized to project the image of the transparency directly onto easel 22, the photomultiplier PM1 is adjusted until its light-transmitting aperture is responsive to a neutral (gray) highlight area of the transparency although any area of the transparency can actually be used. For programming the color balance information, a larger photomultiplier aperture may be used to integrate or average out the color balance over a larger area of the transparency. For flexibility, the red controls 68R, 70R and 72R are set to their midpoints and by using the color sensitivity control 80 (or by adjusting the diaphragm 16) the meter pointer 58 is brought to 15 seconds. As will be apparent from the following description, adjustment of diaphragm 16 and movement of color sensitivity control 80 serve essentially the same function.

Once the diaphragm and color sensitivity control 80 have been established to bring meter pointer 58 to 15 seconds, the function switch 50 is switched to the GREEN position. Then, using only the green color controls 68G, 70G and 72G, the meter pointer 58 is brought to 32 seconds. In the same way, after the function switch has been moved to the blue position, the blue color controls 68B, 70B and 72B are adjusted to bring the meter pointer 58 to 45 seconds. It may be necessary to repeat the process a number of times to make sure that the exact balance exists, that is, that subsequent adjustments have not affected prior readings.

Once the apparatus has been programmed for a particular film and developing process as described, no further trial and error experimentation is required to produce the same results with the same film and process. Thus, assume that the exposure controls 62, 64 and 66 and the color balancing controls 68, 70 and 72 have been set to particular positions corresponding to a particular process. Assume further that a new transparency is to be reproduced and that the enlargement desired differs from the original reference setup. Under these circumstances, the amount of light reaching the film 24 on easel 22 will differ from the reference level (i.e., the level used to program the device), and because of the use of a new transparency, it is likely that the color balance will differ from that of the reference transparency.

The console controls illustrated in FIG. 1 are in the positions determined as described above to program the device for the reference transparency and desired developing process. The first step is to determine the color balance required for the new transparency. Thus, the photomultiplier PM1 is placed to read the light values on the easel existing for a neutral area of the new transparency. Again, the placement of photomultiplier PM1 is not critical, with a neutral area being preferred to attempt to obtain generally equal color values. Function switch 50 is then moved to the RED position and by adjusting diaphragm 16 or color sensitivity control 80 (both of which cause the same effect in the circuit) the meter pointer 58 is brought to the 15-second position.

The function switch is then moved to the GREEN position and the meter reading observed. If it differs from the original nominal reference level (32 seconds in this particular example), the timer 82G is changed to correlate with that new value. In other words, if in the GREEN switch position for a new transparency, the meter reads 37 seconds, counter 82B is set up to 37 seconds. The function switch is then moved to the BLUE position and the same adjustment made.

After this procedure, the color balance has been set for the new transparency so that proportional exposure times will produce the exact color balance required in the red, green and blue separation negatives. It is necessary to ensure that the proper amount of light will be available during the exposure intervals as determined above. For this purpose, the photomultiplier PM1 is positioned on the easel to be responsive to a bright highlight of the new transparency and the function switch 50 set to the NO FILTER position. The "red read" switch 51 is then actuated to place the red filter 18R in front of the lens 14. The meter reading is then observed and, if it differs from the required 15-second reference level (indicating a change in light intensity and/or transparency density), the diaphragm 16 is adjusted until the amount of light (in the bright highlight area) falling on photomultiplier PM1 results in a meter reading exactly equal to 15 seconds. At this point it is certain that the required amount of light is available for the specific film and process being used, and that the exposure intervals for the three separation negatives are exactly correct. It is now possible to proceed with the actual exposures.

After the film 24 has been suitably positioned on easel 22 (and appropriate measures taken to guard against stray light), the function switch 50 is returned to the RED position and the main exposure switch 52M is actuated. The start switch 53 is then actuated to initiate the 15-second "main" exposure interval. The monitoring circuits 36, as explained in detail below, ensure that the exact amount of light desired will be produced regardless of any change in intensity of the lamp 10 during exposure. Essentially, this is done by integrating the light output of the lamp 10 and using this output to control the length of the timing interval. After the main exposure, it may then be desired to make the "bump" or "no-screen" exposure. Generally, this exposure will be a fixed percentage of the main exposure, for example, four percent. To obtain this four percent interval, the controls 88R, 90R and 92R are set to the main exposure interval (015) and the percentage control 94 is placed in the 4 position. This means that when the "bump" switch 52B is actuated, an exposure interval of 0.60 second (0.04×15) will result upon actuation of start switch 53.

After the "bump" exposure, the "flash" exposure is selected by sequential actuation of the switches 52F and 53 after the timing switches 96R and 98R having been set to the desired "flash" interval. Although the control for the "flash" interval is provided by the control unit 28 of the invention, the actual timing is provided by an external timer 40 which, in the preferred embodiment, is separate from the invention.

The same process is followed to make the green and blue negatives, using, of course, the GREEN and BLUE function switch positions. The result is three separation negatives in which each includes three separate exposures all of which are perfectly timed, with the color balance exactly as desired.

The production of the black separation negative does not depend upon any relative color balance. Accordingly, in the BLACK function switch position, the balancing color resistors are removed from the meter circuits but the black timer 82C is set in essentially the same fashion as described above with respect to the three colors and the black exposure negative made using the console in the same fashion as described above.

In the following description of FIGS. 2, 3A and 3B which relate in part to a relay control circuit, the coils of the relays are indicated by capital letters with the corresponding contacts of each relay being indicated by the same letter, but in lower case, with an adjacent numeral to distinguish different contacts of the same relay. All relay contacts are illustrated in their normal position with no energizing voltage applied to the associated coil. Where the relay contact consists of a single-pole double-throw switch each of the stationary contacts and the movable armature have been labeled. As an example of the foregoing, when relay H is energized, the armature h1 moves from the normally closed contact h2 to close the normally open contact h3.

The three different modes of operation described with reference to FIG. 1 were identified as "bump," "main" and "flash." These three modes are controlled by manual pushbuttons 52B, 52M, and 52F (FIG. 1B), which in FIGS. 2, 3A and 3B are represented by the respective letters B, M and F followed by a numeral. To avoid unnecessary cluttering of the drawing, mechanical connections between the ganged switches have not been illustrated but it is understood that each such switch having the same capital letter will be simultaneously actuated. Conversely, no two switches have different letters can be actuated at the same time.

The function switch 50 which operates to select the filter position and consequently each of the individual memory banks for the individual separation plates, is a multipole ganged switch. In FIGS. 2, 3A and 3B, the function switch is indicated by the letters FS followed by a numeral to distinguish the separate switch banks. Again, it is understood that each of the function switches are ganged together and that all are in the same position at the same time. The function switch positions are indicated as N, R, G, B and Z which correspond, respectively, to the NO FILTER, RED, GREEN, BLUE and BLACK positions of FIG. 1B. To the extent possible, the numerals used in describing FIGS. 1A and 1B are used to identify corresponding elements in FIGS. 2, 3A, and 3B. Specifically, all decade resistors in FIGS. 2, 3A and 3B are identified by the numeral used to identify its corresponding control member in FIG. 1B.

The exposure and sensitivity circuits and color control circuits are shown in FIG. 2. The anode of the photomultiplier PM1 is connected through function switch bank FS1 and a selectable variable resistance to a high voltage source appearing on the line 99. In the N (no filter) position of the function switch, the color exposure variable decade resistors 62, 64 and 66 are connected in series with the photomultiplier PM1. In the Z (black) function switch position, the black color control resistors 74, 76 and 78 are series connected in the high voltage supply for photomultiplier PM1. The R, G, and B terminals of function switch FS1 are coupled to one end of the color sensitivity resistor 80, the other end of which is connected to high voltage terminal 99.

The output of the photomultiplier PM1 is coupled through a conventional vacuum tube volt meter circuit 100 to the meter 54. The other side of meter 54 is connected in series with variable color balancing decade resistors 68, 70 and 72 (R, G, or B) in the respective R, G, and B function switch positions. In the N and Z function switch positions, these decade resistors are removed from the circuit.

Thus, the control circuit of FIG. 2 provides a means for adjusting the high voltage applied to the photomultiplier PM1 as well as a means for adjusting a series resistor in circuit with the meter 92. This dual adjustment provides a means for programming the device for color balance and exposure time.

For example, returning to the example considered above with respect to FIGS. 1A and 1B, during the initial calibration for exposure data with the function switch in the "no-filter" (N) position, the light impinging upon photomultiplier PM1 (and passing through a bright highlight of the transparency 15) will cause a particular meter reading. By adjusting the color exposure controls 62, 64 and 66, the high voltage supplied to photomultiplier PM1 is changed thus changing the output voltage produced for the same amount of light (i.e., the same highlight). Accordingly, these color exposure controls can be adjusted to bring the meter pointer 58 to a desired reading (15 seconds in the example). Thereafter, with the color exposure controls set in the same position and a different transparency 15 in position, with the photomultiplier PM1 positioned to be responsive to a new bright highlight, if more or less light strikes the photomultiplier, the output voltage will be higher or lower, respectively, as the case may be. The resultant change in the meter reading will indicate that there is either too much light or too little light available (either because of the change in density of the new transparency or a change in intensity of the light source at the easel 22), thus indicating to the user that the diaphragm control 16 must be adjusted so that the amount of light impinging upon the photomultiplier in the bright highlight area will produce the same meter reading, that is, 15 seconds. Thereafter, a 15-second exposure with the new transparency will produce the same results as a 15-second exposure with the reference transparency.

The color balancing controls 68, 70 and 72 affect only the meter reading and not the output of photomultiplier PM1. This permits relative color balance to be programmed. Thus, when photomultiplier PM1 is responsive to light passing through a neutral gray area of any transparency 15, any change in the meter readings (in the respective function switch positions) will indicate that the color balance of that transparency differs from the reference transparency. In other words, if instead of a 15-to-32 red to green color balance, there exists a 15-to-37 relationship for a different transparency, when the function switch is placed in the GREEN (G) position, (with the green filter in front of lens 14) the reduction in the meter reading will indicate that there is "less" green than in the reference transparency and a longer green exposure interval is required.

Since the color sensitivity control 80 is connected in the high voltage supply of photomultiplier PM1 in the R, G, and B function switch positions, it has the same effect on the photomultiplier output as would a change in light intensity (for example, due to adjustment of diaphragm control 16). The color sensitivity control 80, however, has no effect whatsoever upon the relative balance of the red, green and blue color controls and affects each one equally. The color sensitivity control 80 and the diaphragm 16 may be used interchangeably (or as convenience dictates) to set the red exposure interval at the same reading as the required exposure interval (e.g., 15 seconds) so that all exposure intervals will be referenced directly to the required main exposure time.

In the N and Z function switch positions, the color balancing resistors 68, 70 and 72 are removed from the meter circuit, which means that it is the photomultiplier output alone which is programmed. In the case of the black color separation plate, there is no relative balance (which is unnecessary) since the resistors 74, 76 and 78 are in the high voltage supply, but, from a practical viewpoint, this arrangement provides greater range and is more convenient.

The combination of the high voltage photomultiplier control and the adjustable resistors in the metering circuit, provide great versatility in programming the device for an extraordinarily wide range of operations and conditions. The use of a photomultiplier is advantageous as compared to other types of photoelectric devices since it provides independent controls through the high voltage supply, the output voltage and the impinging light. Because the photomultiplier PM1 measures light intensity (analogous to density) directly on the enlarging easel, it is a more accurate and reliable measuring means than any means which makes equivalent measurements (e.g., by conventional densitometric evaluations) off-easel or off-camera. Such equivalent measurements will differ substantially from the characteristics which will be recorded at the image plane of the film. Since this invention depends upon the programming of the circuits with accurate reference data, the use of this particular photometric technique is of particular utility with the invention.

FIGS. 3A and 3B illustrate the monitoring and timing circuits which control energization of the exposing light source. Referring to FIG. 3A, the monitoring photomultiplier PM2 is shown connected to a conventional amplifier 102. Photomultiplier PM2 is arranged to monitor the light output of the light source 10 within the enlarger (or other apparatus) so that the amount of light provided during an exposure interval will not vary as a function of the intensity of the light source. Normally, photomultiplier PM2 is connected to a high-voltage line 103 (which produces the photomultiplier operating potential) through armature i5 and contact i6.

In the "main" exposure mode, the light source 10 is monitored by a pair of RC circuits consisting of capacitor C1 and resistor R1, and capacitor C2 and Resistor R2. These two RC circuits, as explained below, are alternately connected to the grid of amplifier 102 to produce pulses at a nominal rate (generally 1 second), the rate depending upon the photomultiplier output and thus the intensity of the light source. In the "bump" mode, banks of adjustable capacitors CR, CG, CB and CZ (controlled by knobs 88, 90, 92) are connected to the grid of amplifier 102 through function switch bank FS3. At the same time the biasing voltage applied to the photomultiplier PM2 is varied by a selected one of decade potentiometers 94R, 94G, 94B or 94Z connected in circuit with photomultiplier PM2 through switch banks FS4.

With respect to the capacitors CR, CG, CB and CZ, although each is indicated as a single adjustable capacitance, in fact, in each case the capacitance will comprise a bank of capacitors plus various switches (the switches being responsive to controls 88, 90, and 92) to automatically select the amount of capacitance required for a given time interval. The potentiometers 94R, 94G, 94B or 94Z adjust the percentage (for example, 2 through 10 percent) of the total time interval selected by the capacitors CR, CG, CB or CZ as explained above with respect to FIG. 1B. These percentage potentiometers are selectively enabled through function switch banks FS4 and FS5.

In FIGS. 3A and 3B seven control relays are shown as D, E, F, G, H, I and J relays, the functions of which are described below in connection with a specific example. Four additional relays XR, XG, XB and XZ operate to interrupt certain holding circuits as will be explained and are also connected to the red, green, blue and black counters 82R, 82G, 82B and 82Z, respectively, so that the energizing circuit for each of these relays can be closed when the associated counter has counted the selected number of timing pulses (i.e., when the counter indicates a zero count). This is shown diagrammatically in FIG. 3B by the dashed line between counters 82R, 82G, 82B, 82Z and respective normally open switches 104R, 104G, 104B and 104Z in the relay circuits. An additional function switch bank FS6 operates to connect one of the contacts $xr2$, $xg2$, $xb2$, or $xz2$ in the holding circuit mentioned above. The alternating line voltage for energizing the relays (and lamp 10) is considered to be on the bus 116.

An explanation of the circuit illustrated in FIGS. 3A and 3B can best be accomplished by considering specific examples for both the "main" and "bump" modes. Thus, assume that the function switch has been placed in the R position and that the main mode switch 52M has been depressed to close the switches M1 and M2. To expose the film on the easel, it is only necessary to push the start button 53 which causes the following sequence of events.

Upon closure of switch 53, relay D (FIG. 3B) is energized closing contact $d2$ to energize the latching relay E from the line voltage on bus 116 through relay contact $xz2$, function switch FS6, relay contact $j2$ and $j3$, the closed "main" switch M1, relay contact $d2$, and closed "main" switch M2. This simultaneously connects the line voltage on bus 116 to the output line 120 (through the same circuit) which is fed to the enlarger lamp 10 to initiate the film exposure.

Relay E is a latching relay which is maintained energized by closure of its own contact $e2$ through a holding circuit comprising relay contacts $j2$, $j3$, the function switch FS6, relay contact $xr2$, contact $e2$ and the closed cancel switch 55. Hence, deenergization of relay D by removal of actuating pressure from the start switch 53 will not prevent application of the energizing voltage to the enlarger lamp and relay E. The closing of contact $e2$ also results in the energization of relay F which removes the short on the output of photomultiplier PM2 (FIG. 3A) by moving armature $f2$ from contact $f3$ to contact $f4$ thus also simultaneously applying an operating voltage across the amplifier 102.

The relay coil G is connected in the plate circuit of amplifier 102 such that when the capacitor C1 or C2 connected in the grid circuit is fully discharged, maximum plate current will flow to energize relay G. Hence, under the illustrated conditions, and assuming that capacitor C1 is discharged, relay G will be energized upon actuation of "start" switch 53, closing the contact $g2$ (FIG. 3B) to energize a cycling relay H. When this occurs, the relay armature $h2$ transfers from contact $h3$ to contact $h4$ connecting the capacitor C2 to the grid of amplifier 102. Since capacitor C2 will necessarily be discharged (by virtue of the previously closed contact $h5$) plate current will flow and relays G and H will remain energized causing a charge to start to build up on capacitor C2.

When the charge on capacitor C2 reaches a predetermined value, the reduction in the plate current of amplifier 102 will deenergize relay G opening contact $g2$ and deenergizing relay H. This then transfers relay armature $h2$ from contact $h4$ to contact $h3$ and closes contact $h5$ (to permit discharging of capacitor C2), while simultaneously opening contact $h6$ to permit capacitor C1 to receive a charge.

This process continually repeats with the capacitors C1 and C2 being alternately charged and discharged by the periodic energization of relay H through the contact $g2$. Desirably, for a given set of conditions, this interval will be one second, but as should be apparent from the foregoing explanation, in the event the output of photomultiplier PM2 differs substantially from the nominal level which would produce a 1-second cycle (indicating a variation in light intensity), the change in the photomultiplier output voltage will produce a resultant change in the charge time of the capacitor C1 or C2 so that cycling will not occur until the integrated light value has reached a desired level.

These periodic pulses produced by the opening and closing of contact $g2$ are fed through contact $j5$ and $e3$ to the armature of function switch FS5 which applies the pulses to relay XR. Counter 82R is stepped by a count of "1" upon receipt of each pulse produced by the closing of contact $g2$, until upon reaching the count of "0" (after 15 nominal "seconds" in this example), counter 82R causes switch 104R to close thereby energizing relay XR to open contact $xr2$ and break the holding circuit for the latching relay E. When this occurs, the circuit from the line voltage on bus 116 to output line 120 is broken and the enlarger lamp 10 is deenergized. The opening of contact $e3$ disconnects counter 82R from the circuit, while contact $e2$ opens to deenergize relay F preventing operation of amplifier 102 by switching armature $f2$ to contact $f4$. Under these conditions, the circuit is in its illustrated quiescent state.

In the "bump" mode, one of the "adjustable" capacitors CR, CG, CB or CZ is connected in the plates of amplifier 62 instead of the alternating capacitors C1 and C2. Thus, when the "bump" switch 52B (FIG. 1B) is actuated closing switches B1, B2 and B3 (FIG. 3B), relays I and J are energized through switch B1. Assuming the function switch is in the R position, capacitor CR (FIG. 3B) is connected to amplifier 102 through bank F3, armature $i2$ and contact $i3$. Simultaneously, armature $i5$ moves from contact $i6$ to contact $i7$ removing the direct connection between the high-voltage line 103 and photomultiplier PM2 and connecting the photomultiplier plate instead to the armature of function switch bank FS4.

A variable resistor 110 is connected between the high-voltage terminal 103 and the common upper ends of each of potentiometers 94R, 94G, 94B and 94Z, the other ends of which are connected respectively to the R, B, G, and Z terminals of switch bank FS4. Additionally, a voltage divider 112 is connected between the junction of the potentiometers and variable resistor 110 and ground, with its movable tap 112a being connected to the armature of function switch bank FS5. The terminals of bank FS5 are connected to the bottom ends of the potentiometers 94R, 94G, 94B, and 94Z. Hence, the high voltage supply for photomultiplier PM2 in the "bump" mode comprises the voltage dividing potentiometer 94R, 94G, 94B or 94Z with the voltage on both ends of the selected potentiometer being determined by control of resistor 110 or voltage divider 112. By so controlling the high voltage supply to the photomultiplier PM2, it is possible to change the relationship between photomultiplier output and lamp intensity. Thus, once the setting for resistor 110 and potentiometer 112 have been properly established, it is readily possible to provide potentiometer 94R, 94G, 94B and 94Z with values such that the voltage output of photomultiplier PM2 is a known percentage of the voltage level which would exist if the high voltage from terminal 103 were coupled directly to photomultiplier 60. Assuming that the adjustable values of capacitors CR, CG, CB or CZ are suitably selected relative to the indicator controls 88, 90 and 92 (R, G, B or Z) and the indicated values of controls 94 (R, G, B or Z), it is possible to control the cycling period of relay G (which is dependent upon the voltage level across photomultiplier PM2 and the value of the selected capacitance) so that the period will always be indicated by the product of the indicator setting of control 94 (e.g., 0.02 to 0.10) and the three-digit number indicated by the settings of the associated hundreds control 88, tens control 90 and units control 92.

Continuing with the example, when the start switch 53 is closed in the "bump" mode, relay D again is energized causing the latching relay E to be energized from line 116 through the "bump" switch B2, contact $d2$, and bump switch B3. Again, as in the "main" operating mode, a holding circuit is completed through contact $e2$, but this time the holding circuit is coupled to the line voltage on bus 116 through armature $j3$, contact $j4$ and the closed contact $g2$.

At the same time, relay F is also energized through contacts g2, j4, j3 and e2 to remove the short across the grid of amplifier 102 (FIG. 3A) by moving armature f2 to contact f4 and applying the necessary operating voltage to the amplifier. This then results in the energization of relay G, as explained before, under the assumption that the capacitor CR connected in the grid circuit of amplifier 102 through armature i2 and contact i4 is discharged. Under these circumstances, the charge on capacitor CR starts to build until it causes a sufficient reduction in plate current to deenergize relay G, opening contact 92 and breaking the holding circuit to relay E while opening the output circuit to the enlarger lamp on line 120.

Thus, as explained in general terms with reference to FIG. 1, the timing interval is readily selected by the combination of the capacitor CR and potentiometer 94R, since relay G will be energized periodically at a rate proportional to the product of the voltage level on the movable tap of potentiometer 94R and the capacitance of capacitor CR.

In the "flash" mode, with switch 52F actuated, an output line 122 to the flash timer circuits is energized when the start switch 53 is depressed, through switch F1 (closed contact d1, and switch F3).

The combination illustrated and described in this specification has a limitless range of utility in all types of photographic reproduction processes. The invention can be used with any type of enlarger or camera and with any light source capable of exposing photosensitive material. Once the settings for any given film and process have been determined, and a suitable record of these settings made, the invention may be used for the same conditions by merely reprogramming the control apparatus to effectively reestablish the same conditions. Despite the limitless number of possible combinations which may require changes in exposure and color sensitivity, once the programming data is known, the apparatus may always be programmed to accommodate any conceivable film and/or development process. After the apparatus has been programmed, no further trial and error experimentation is required to insure production of perfect color separations. The use of highly sensitive photomultipliers not only enhances sensitivity as compared with prior art devices for the same purpose, but also provides an added degree of control by means of high-voltage supply for the photomultiplier. The photometer system of the preferred embodiment is capable of yielding a wide range of useful photometric and photographic data relating, for example, to density, exposure time, illumination level, density range, percentage dot area, mask factors, filter factors, and others. For such purposes, the meter face may be recalibrated and/or relabelled as may be convenient.

The light monitoring circuits can be used in essentially the manner described to control exposure intervals in response to variations in luminous flux due to a change in intensity or distance of the light source in any photographic exposure device. In a camera, the photomultiplier PM1 may be placed at the camera back (before insertion of film) to measure relative intensity.

By "intensity" in this specification and the attached claims, is meant the luminance or luminous flux deriving from the light source being utilized as measured by the photosensitive monitoring means.

No effort has been made to detail all the possible uses for the control apparatus as described herein. Obviously, individual portions of the apparatus may be used apart from the overall combination as illustrated. In this respect, it is contemplated that the timing modules will be sold individually and in combination with the photometric measuring circuits (associated with photomultiplier PM1) illustrated. Of course, the exposure and color-balancing controls may be used with timing circuits other than those illustrated herein. Numerous other modifications and uses of the invention will be obvious to those skilled in the art and therefore the invention should be defined primarily by reference to the attached claims.

We claim:

1. Photographic apparatus for determining the exposure intervals required to produce a plurality of color separation images corresponding to respective primary colors, comprising a control console and a movable photomultiplier being adapted to be placed so as to be sensitive to light levels existing substantially at the plane of the negative to be produced, said control console comprising
   meter means for measuring and indicating the current output from said photomultiplier,
   a multibank function switch with each bank having at least three color switch terminals corresponding, respectively, to said primary colors where appropriate light filters are adapted to be positioned in front of an exposure light source and a terminal where no filter is positioned in front of said light source, each bank further including a movable armature adapted to electrically contact one of its associated terminals,
   variable exposure resistor means (62, 64, 66) connected between a photomultiplier operating voltage source (99) and the no filter terminal of one bank,
   variable sensitivity resistor means (80) connected between said voltage source and said three color terminals of said one bank, with the armature of said one bank being connected to the high-voltage circuit of said photomultiplier,
   three variable color control resistor means (68, 70, 72) connected to respective color terminals of a second function switch bank, with the armature of said second bank being adapted to connect one of said variable color control resistor means in series with said meter means when contacting one of its color terminals, and to bypass all of said color control resistor means when contacting its no filter terminal.

2. Apparatus according to claim 1, wherein said variable exposure resistor means and said color control resistor means each includes coarse and fine decade resistors.

3. Apparatus according to claim 2, wherein said variable sensitivity resistor means includes a continuously variable resistor.

4. Timing apparatus for producing a preselected amount of light, comprising
   photosensitive means for producing an electrical output voltage proportional to the intensity of said light,
   first and second timing circuits, each including capacitance means having a discharge path through a parallel connected resistance means,
   means for producing a voltage adapted to energize said light source,
   means for alternately connecting said timing circuits to the output of said photosensitive means while simultaneously opening the discharge path of the capacitance means in the connected timing circuit and closing the discharge path of the capacitance means in the disconnected timing circuit, said connecting means being responsive to a predetermined charge on the capacitance means of the connected timing circuit, the charging interval of which is thereby dependent upon the output of said photosensitive means, means operative after a preselected number of alternate charging intervals for disconnecting said light source from said voltage-producing means.

5. Light-timing apparatus according to claim 4, wherein said connecting means includes switch means for connecting said photomultiplier to one of said capacitance means and opening and closing both of said discharge circuits, and means for operating said switch means when the charge on the capacitance means connected to said photomultiplier has reached a predetermined level.

6. Apparatus for energizing a light source over an adjustable, predetermined time interval, comprising
   timing means including first indicator means for producing an electrical signal corresponding to a first time interval, said first indicator means displaying a number representative of said first time interval, and percentage-timing means including second indicator means for varying said signal according to a predetermined percentage of said first time interval, said second indicator means displaying a number representative of said percentage, the varied signal corresponding to said predetermined time interval.

7. Apparatus according to claim 6, wherein said timing means includes variable capacitance means operatively coupled to said first indicator means.

8. Apparatus according to claim 7, wherein said percentage timing means includes variable resistance means operatively coupled to said second indicator means.

9. Apparatus according to claim 8, including photoelectric means responsive to said light source for charging said variable capacitance means, the output of said photoelectric means being dependent upon the operating voltage applied thereto, said variable resistance means being adapted to vary said operating voltage.

10. Timing apparatus for energizing a light source over an adjustable, predetermined time interval, comprising
a photomultiplier,
means for producing a voltage adapted to energize said light source,
adjustable voltage divider means for connecting said photomultiplier to a high-voltage operating potential,
variable capacitance means connected to the output of said photomultiplier, and
means responsive to a predetermined voltage across said variable capacitance means for disconnecting said light source from said voltage-producing means.

11. Light-timing apparatus according to claim 10, wherein said adjustable voltage divider comprises a first potentiometer having a slidable contact connected to said photomultiplier and means for adjusting the voltage across said potentiometer.

12. Light-timing apparatus according to claim 11, wherein said photosensitive means comprises a photomultiplier, and further comprising
a voltage divider connected across a voltage source adapted to provide an operating potential for said photomultiplier,
variable capacitance means, and
switching means for selectively connecting said photomultiplier to said voltage source and said variable capacitance to the output of said photomultiplier, or for connecting said photomultiplier directly to said voltage source and said timing circuits, said disconnecting means being responsive to a predetermined charge on said variable capacitor means when it is connected to the photomultiplier output.

* * * * *